United States Patent
Winger

(10) Patent No.: US 8,045,062 B2
(45) Date of Patent: *Oct. 25, 2011

(54) CONTOUR FREE POINT OPERATION FOR VIDEO SKIN TONE CORRECTION

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/861,950

(22) Filed: Aug. 24, 2010

(65) Prior Publication Data

US 2010/0315559 A1    Dec. 16, 2010

Related U.S. Application Data

(63) Continuation of application No. 11/504,166, filed on Aug. 15, 2006, now Pat. No. 7,821,580.

(51) Int. Cl.
*H04N 9/64* (2006.01)
(52) U.S. Cl. .................. 348/652; 348/653; 348/649
(58) Field of Classification Search .................. 348/643, 348/645–647, 649–654; 345/589, 591–593, 345/600–602, 604; 358/515, 518, 520; 382/162, 382/167; *H04N 9/70, 9/68, 9/64*
See application file for complete search history.

(56) References Cited

U.S. PATENT DOCUMENTS

| 5,191,548 A | 3/1993 | Balkanski et al. | 364/725 |
| 5,559,532 A | 9/1996 | Gardyne | 345/145 |
| 5,568,167 A | 10/1996 | Galbi et al. | 348/589 |
| 5,953,691 A | 9/1999 | Mills | 702/198 |
| 6,124,899 A | 9/2000 | Swan et al. | 348/651 |
| 7,057,671 B2 | 6/2006 | Dumitras et al. | 348/649 |
| 2004/0264788 A1 | 12/2004 | Bazin et al. | 382/239 |

*Primary Examiner* — Sherrie Hsia
(74) *Attorney, Agent, or Firm* — Christopher P. Maiorana, P.C.

(57) ABSTRACT

A method for color tone correction is disclosed. The method generally includes the steps of (A) generating a plurality of first intermediate components by scaling a plurality of first color components towards a first ideal color, wherein the first color components (i) are for a first plurality of pixels in an input video signal and (ii) fall inside a first region of a color space, (B) generating a plurality of first corrected components by adjusting the first intermediate components such that a first mapping of the first color components to the first corrected components is both (i) continuous in the color space and (ii) non-overlapping in the color space and (C) generating an output video signal by combining the first corrected components with a plurality of unaltered color components, wherein the unaltered color components (i) are for a second plurality of the pixels and (ii) fall outside the first region.

20 Claims, 6 Drawing Sheets

CONTOUR FREE POINT OPERATION FOR VIDEO SKIN TONE CORRECTION

This is a continuation of U.S. Ser. No. 11/504,166, filed Aug. 15, 2006 now U.S. Pat. No. 7,821,580, which is incorporated by reference.

FIELD OF THE INVENTION

The present invention relates to digital video processing generally and, more particularly, to a contour free point operation from video skin tone correction.

BACKGROUND OF THE INVENTION

Highly saturated colors are often desirable in displayed video and images. Even unnaturally over saturated colors may often be seen as desirable by many people for video or image composition or viewing. Hence, user saturation adjustment knobs are commonly provided on display devices, even when the correct color display data is known via ancillary information.

Exceptions exist to the preference for over saturated color. For example, the color of human skin, also known as skin tone or "seashell pink", is commonly objected to when over saturated. Other exceptions are natural objects for which a range of reference saturation overrides a general preference for over saturation. Therefore, a color adjustment setting that may be pleasing for the majority of video content is often different than an ideal desirable setting for human skin. Several studies have also shown that at least in some cultures (i.e., Japanese, Korean) there exists an "ideal" skin tone color that is perceived to be the most natural and pleasing color for skin.

Common approaches to adjusting skin tones involve segmenting out spatial areas of the pictures containing skin tone. Separate hue/saturation adjustments are then provided to control the segmented areas. However, the common approaches produce unacceptable results for video. Artifacts are introduced in the segmented areas when the pictures are viewed temporarily. As such, extra contour reduction steps are commonly implemented to reduce the artifacts created by the skin tone adjustment adding complexity. Furthermore, the common approaches do not adjust the color components of the video sequentially or operate in the native color space (i.e., CrCb). Hence, the common approaches cannot be implemented with linear operations or simple lookup tables resulting in expensive custom silicon.

SUMMARY OF THE INVENTION

The present invention concerns a method for a color tone correction. The method generally comprises the steps of (A) generating a plurality of first intermediate components by scaling a plurality of first color components towards a first ideal color, wherein the first color components (i) are for a first plurality of pixels in an input video signal and (ii) fall inside a first region of a color space, (B) generating a plurality of first corrected components by adjusting the first intermediate components such that a first mapping of the first color components to the first corrected components is both (i) continuous in the color space and (ii) non-overlapping in the color space and (C) generating an output video signal by combining the first corrected components with a plurality of unaltered color components, wherein the unaltered color components (i) are for a second plurality of the pixels and (ii) fall outside the first region.

The objects, features and advantages of the present invention include providing a contour free point operation from video skin tone correction that may (i) continuously map skin tone corrections in a color space, (ii) avoid unmapped regions in the color space, (iii) avoid doubly mapped regions in the color space, (iv) adjust the color components sequentially, (v) operate in a native color space of an input signal, (vi) operate with only linear operations, (vii) operate with single dimensional lookup tables and/or (viii) achieve nonlinear mappings.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

To enable separate color reproduction/adjustment for skin tones, as opposed to other content, a method and/or architecture is provided by the present invention to separately control a skin color reproduction for colors represented by skin tones. The present invention differs from conventional methods in that no transforms or color conversions are generally utilized. Furthermore, a separate conventional contour reduction step may be eliminated as a discontinuity-free color warping technique of the present invention generally avoids contour artifacts.

Since the color warping technique operates directly upon native chroma samples of individual pixels (e.g., operates with a Cb component and a Cr component in a YCbCr space) and does not in any way depend upon luminance data or surrounding pixels, the data processing criteria and complexity of the present invention may be reduced compared with conventional methods. The complexity reduction is particularly true for video, which is often represented in sub-sampled chroma formats (e.g., 4:2:0 and 4:2:2 for consumer and professional video respectively). The lack of discontinuities and/or highly nonlinear mappings and an avoidance of area segmentation generally makes the present invention extremely stable for video correction. In some embodiments, a more perceptually uniform mapping may be done in Yu'v' space in place of the YCbCr space.

Figure 1:
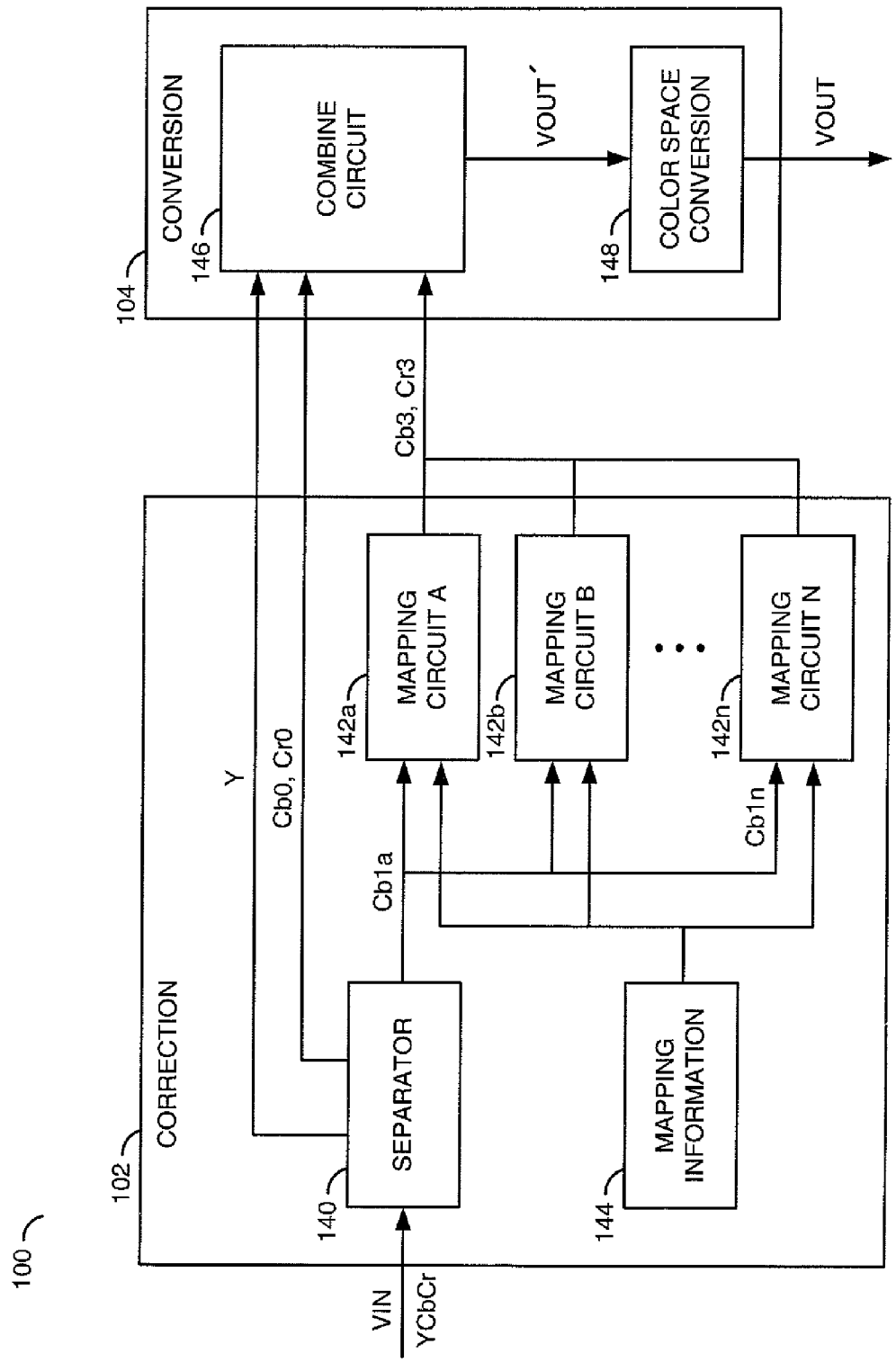
FIG. 1 is a diagram of an example system in accordance with a preferred embodiment of the present invention.

Referring to FIG. 1, a diagram of an example system 100 is shown in accordance with a preferred embodiment of the present invention. The system (or assembly) 100 may be referred to as a tone conversion system. The tone conversion system 100 generally comprises a circuit (or module) 102 and a circuit (or module) 104. An input signal (e.g., VIN) may be received by the circuit 102. A luminance signal (e.g., Y) may be transferred from the circuit 102 to the circuit 104. Multiple color signals (e.g., Cb0, Cr0, Cb3 and Cr3) may also be transferred from the circuit 102 to the circuit 104. The circuit 104 may generate and present an output signal (e.g., VOUT).

The circuit 102 may be referred to as a correction circuit. The correction circuit 102 may be operational to adjust one or more regions of a color space to correct skin tones, natural colors and/or any arbitrary color region.

The signal VIN may be one or more analog video signals and/or one or more digital video signals. The signal VIN generally comprises a sequence of progressive-format frames and/or interlace-format fields. The signal VIN may include synchronization signals suitable for synchronizing a display with the video information. The signal VIN may be generated in analog form as, but is not limited to, an EIA-770 (e.g., YCrCb) signal. In digital form, the signal VIN may be generated as, but is not limited to, a High Definition Multimedia Interface (HDMI) signal, a Digital Video Interface (DVI) signal, a BT.601 signal, and/or a BT.656 signal. The signal VIN may be formatted as a standard definition signal or a high definition signal.

The signal VOUT may be one or more analog video signals and/or one or more digital video signals. The signal VOUT generally comprises a sequence of progressive-format frames and/or interlace-format fields. The signal VOUT may include synchronization signals suitable for synchronizing a display with the video information. The signal VOUT may be generated in analog form as, but is not limited to, an RGB (Red, Green, Blue) signal, an EIA-770 (e.g., YCrCb) signal, an S-video signal and/or a Composite Video Baseband Signal (CVBS). In digital form, the signal VOUT may be generated as, but is not limited to, a High Definition Multimedia Interface (HDMI) signal, a Digital Video Interface (DVI) signal, a BT.601 signal and/or a BT.656 signal. The signal VOUT may be formatted as a standard definition signal or a high definition signal.

The signal Y generally represents a luminance component of the video in the signal VIN. The signals Cb0 and Cb3 may carry first color (e.g., blue) components of the video. The signals Cr0 and Cr3 may carry second color (e.g., red) components of the video. Generally, the signals Cb0 and Cr0 represent color information unmodified by the circuit 102. The signals Cb3 and Cr3 may carry corrected color information for the video.

Figure 2:
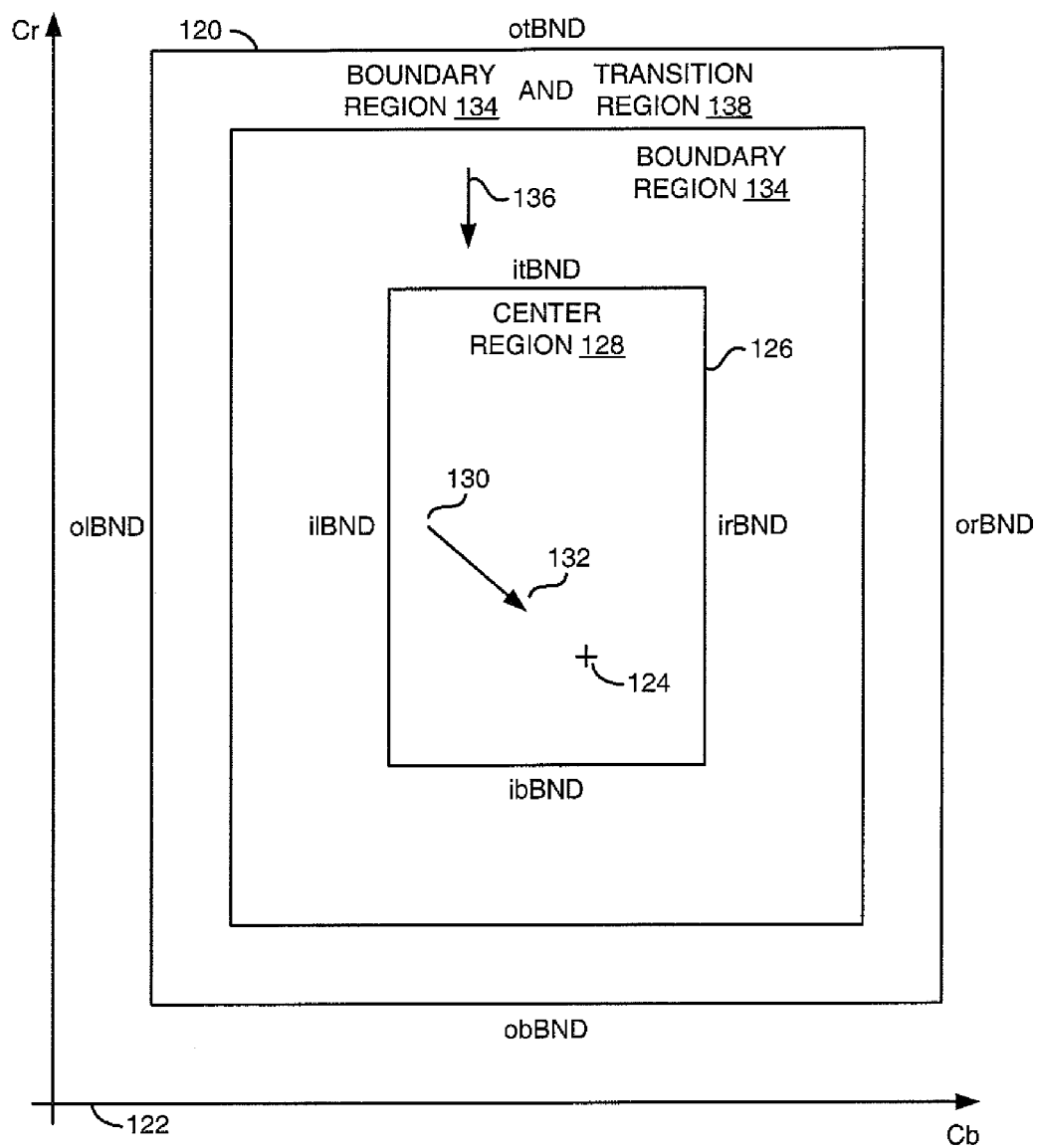
FIG. 2 is a diagram of an example region in a joint color space.

Referring to FIG. 2, a diagram of an example region 120 in a joint color space 122 is shown. A basic method of color tone correction implemented by the correction circuit 102 generally comprises a chroma-sample (only) process. A skin tone recognition may be performed in the joint color space 122 (e.g., a Cb,Cr color space). The recognition may be performed on pixels having colors that fall within the skin tone recognition region (or zone) 120 in the joint color space 122. A shape of the region 120 may include, but is not limited to, a rectangle (for simplicity) as the detection/recognition zone. Other region shapes such as ellipses, ovals and hexagons may be implemented for an alternative detection performance. In some embodiments, the shape, location and number of regions 120 may be predetermined. In other embodiments, the shape, locations and/or numbers of regions 120 may be calculated during operation.

The skin tone processing performed by the correction circuit 102 is generally done jointly on the Cb value and the Cr value of the recognized samples. The input used from the signal VIN for the processing may be limited to the Cb value and the Cr value of a current (pixel) sample to produce a corrected value for the current sample. The colors of neighboring pixels may be ignored in calculating the corrected values for the current sample.

A single desired color pair 124 (e.g., (mapCb, mapCr)) may be identified as an "ideal" representative color point for all samples with colors within the detection region 120. The Cb value and the Cr value of samples within the detection region 120 may be mapped through piecewise linear functions, which may greatly simplify the implementation. Nonlinear functions may also be implemented to meet the criteria of a particular application.

Samples that are within an inner boundary 126 of the detection region 120 may be moved closer to the ideal color pair 124 by a fixed fraction. The inner boundary 126 may define a central region 128. The movement may relocate each of the Cr values and the Cb values twice as close to the ideal color value 124 compared with the original Cr values and the original Cb values. For example an original (Cb,Cr) color sample 130 within the central region 128 may be moved to a position 132. Movement in the central region 128 typically has a linear slope of less than 1.

A boundary region 134 may be defined within the detection region 120 and outside the central region 128. Samples (e.g., a sample 136) falling within the boundary region 134 may be mapped to the other samples within the detection region 120 continuously, such that the entire input color region is spanned by the output color region.

A transition region 138 may be defined along a perimeter of the detection region 120. The transition region 138 generally allows for a continuous blending (warping) of the color space 122 from inside the detection region 120 to outside the detection region 120.

Referring again to FIG. 1, the correction circuit 102 generally comprises a circuit (or module) 140, one or more circuits (or modules) 142a-142n and a circuit (or module) 144. The signal VIN may be received by the circuit 140. The circuit 140 may transfer the signals Y, Cb0 and Cr0 to the conversion circuit 104. The circuits 142a-142n may transfer the signals Cb3 and Cr3 to the conversion circuit 104. Each of the circuit 142a-142n may receive a pair of signals (e.g., (Cb1a,Cr1a) through (Cb1n,Cr1n) respectively) from the circuit 140. The circuit 144 may transfer information to each of the circuits 142a-142n.

The circuit 140 may be referred to as a separation circuit. The separation circuit 140 may be operational to separate the pixels received in the signal VIN based on the positions in the color space 122.

Each of the circuits 142a-142n may be referred to as a mapping circuit. Each of the mapping circuits 142a-142n may be operational to map the samples received from the separator circuit 140 within a different detection region 120. Each different detection region 120, central region 128, boundary region 134 and ideal color point 124 may be based on the information provided from the circuit 144.

The circuit 144 may be referred to as a memory circuit. The memory circuit 144 may store (e.g., permanently or dynamically) the information defining one or more detection regions 120. In some embodiments, the mapping information may be designed into the mapping circuits 142a-142n.

The conversion circuit 104 generally comprises a circuit (or module) 146 and a circuit (or module) 148. The circuit 146 may receive the signals Y, Cb0 and Cr0 from the separator circuit 140. The signals Cb3 and Cr3 may be received by the circuit 146 from the mapping circuits 142a-142n. The circuit 148 may present the signal VOUT. The circuit 146 may transfer a signal (e.g., VOUT') to the circuit 148.

The circuit 146 may be referred to as a combine circuit. The combine circuit 146 may be operational to generate the signal VOUT' by combining the sample data from the signals Y, Cb0, Cr0, Cb3 and Cr3. Each pixel in the signal VOUT' may be a combination of a luminance value in the signal Y and two color values from either the signals Cb0,Cr0 or the signals Cb3,Cr3 (from the appropriate mapping circuit 142a-142n).

Hence, the samples in the signal VOUT' may be in the original color space (e.g., YCbCr) as the samples in the signal VIN.

The circuit 148 may be referred to as a color space conversion circuit. The color space conversion circuit 148 may be operational to change the color space of the signal VOUT' to create the signal VOUT. In some embodiments, the color space conversion circuit 148 may be present to achieve an intended output color space (e.g., an RGB color space) in the signal VOUT. In other embodiments, the color space conversion circuit 148 may be absent where the YCbCr color space is the intended output color space (e.g., VOUT=VOUT').

Figure 3:
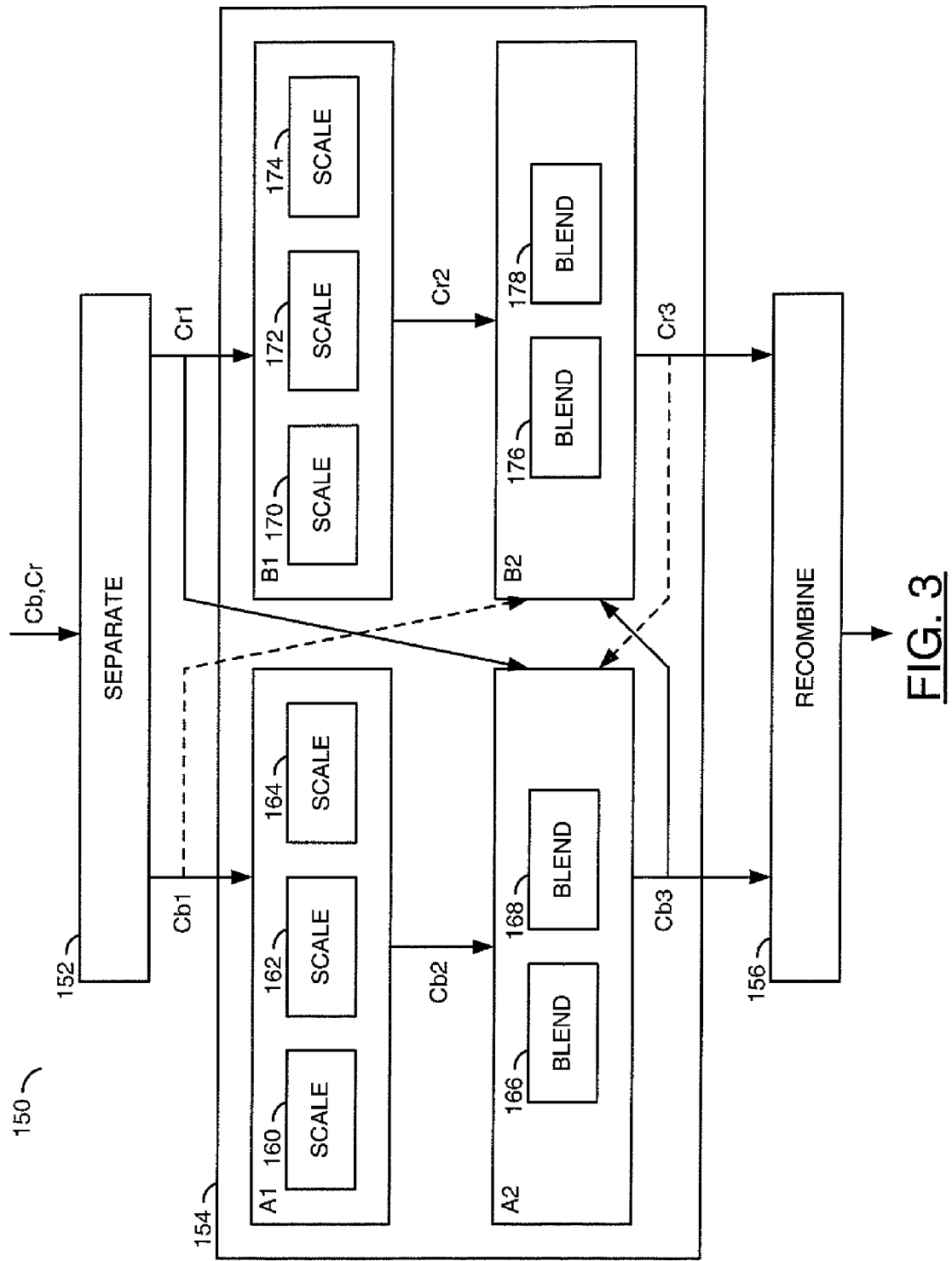
FIG. 3 is a flow diagram of an example correction method for processing a sample.

Referring to FIG. 3, a flow diagram of an example correction method 150 for processing a sample is shown. The method (or process) 150 may be referred to as a correction method. The correction method 150 generally comprises a step (or block) 152, a step (or block) 154 and a step (or block) 156. The step 154 generally comprises a step (or block) 160, a step (or block) 162, a step (or block) 164, a step (or block) 166, a step (or block) 168, a step (or block) 170, a step (or block) 172, a step (or block) 174, a step (or block) 176 and a step (or block) 178. The correction method 150 may (i) be described in terms of a single detection region 120, (ii) refer to the signals Cb1a-Cb1n and Cr1a-Cr1n generically as Cb1 and Cr1 and (iii) use the mapping circuit 142a as a representative example.

In the step 152, the separator circuit 140 may separate each individual incoming sample into a luminance value in the signal Y, a blue color value in a signal Cb1 and a red color value in the signal Cr1. In the step 154, the mapping circuit 142a may correct the blue color value and the red color value to a new blue color value in the signal Cb3 and a new red color value in the signal Cr3. In the step 156, the combine circuit 146 may reunite the new blue color value and the new red color value with the luminance value to generate a mapped sample in the signal VOUT'.

In more detail, the skin tone detection region 120 may contain samples (Cb,Cr) such that Cb ∈ [olBND ... orBND] and Cr ∈ [obBND ... otBND]. The parameters olBND, orBND, obBND and otBND may define an outside left boundary, an outside right boundary, an outside bottom boundary and an outside top boundary respectively of the skin tone region 120.

The central region 128 may contain samples (Cb,Cr) such that Cb ∈ [ilBND ... irBND] and Cr ∈ [ibBND ... itBND], where (i) BND=16 or 24 or 32 and (ii) ilBND=olBND+BND, irBND=orBND−BND, ibBND=obBND+BND and itBND=otBND−BND. The parameters ilBND, irBND, ibBND and itBND may define an inside left boundary, an inside right boundary, an inside bottom boundary and an inside top boundary respectively of the central region 128.

The transition region 138 may contain samples within a distance (e.g., TBND) of the perimeter of the skin tone region 120. The parameter TBND may have a typical value of 16 or 24 or 32. The "ideal" skin tone point 124 is generally contained within the center region 128 at the position (mapCb, mapCr).

The correction step 154 generally comprises four groups of steps, labeled A1, A2, B1 and B2 in the figure. The group A1 generally comprises the steps 160-164. The group A2 generally comprises the steps 166 and 168. The group B1 generally comprises the steps 170-174. The group B2 generally comprises the steps 176 and 178.

For each sample (Cb,Cr) in the skin tone region 120, an adjusted output (e.g., (Cb3,Cr3)) may be computed by the mapping circuit 142a per the steps below. For each sample (Cb,Cr) not in the skin tone region 120, the output may be the same as the input (e.g., Cb3=Cb1 and Cr3=Cr1). Generally, the luminance value is not modified, otherwise skin race may be corrupted.

In the step 160, the mapping circuit 142a generally scales a blue color value Cb1 within the central region 128 (e.g., Cb ∈ [ilBND ... irBND]) towards the ideal mapCb by a scale factor CbScale per equation 1 as follows:

$$Cb2=(Cb1-\text{map}Cb) \times Cb\text{Scale}+\text{map}Cb \quad \text{Eq. 1}$$

In some embodiments, the scale factor CbScale may have a fixed value (e.g., CbScale=0.5).

In the step 162, a blue color value Cb1 within a left side of the boundary region 134 (e.g., Cb ∈ [olBND ... ilBND]) may be scaled to make the mapping continuous per equation 2 as follows:

$$Cb2=(Cb1-olBND) \times (BND+(\text{map}cb-ilBND) \times Cb\text{Scale})/BND+olBND \quad \text{Eq. 2}$$

In the step 164, a blue color value Cb1 within a right side of the boundary region 134 (e.g., Cb ∈ [irBND ... orBND]) may also be scaled to make the mapping continuous per equation 3 as follows:

$$Cb2=(Cb1-orBND) \times (BND+(irBND-\text{map}Cb) \times Cb\text{Scale})/BND+orBND \quad \text{Eq. 3}$$

Within the transition region 138, a gradual blending of the mapping transition may be performed in a continuous way per equations 4 and 5 as follows:

$$Cb\text{Adjust}=\min(TBND,\min(otBND-Cr1,Cr1-obBND)) \quad \text{Eq. 4}$$

$$Cb3=(Cb2 \times Cb\text{Adjust}+Cb1 \times (TBND-Cb\text{Adjust}))/TBND \quad \text{Eq. 5}$$

The corrected blue color value may then be ready for recombination with the luminance component by the combine circuit 146 (e.g., the step 156).

In the step 170, the mapping circuit 142a generally scales a red color value Cr1 within the central region 128 (e.g., Cr ∈ [ibBND ... itBND]) towards the ideal mapCr by a scale factor CrScale per equation 6 as follows:

$$Cr2=(Cr1-\text{map}Cr) \times Cr\text{Scale}+\text{map}Cr \quad \text{Eq. 6}$$

In some embodiments, the scale factor CrScale may have a fixed value of 0.5.

In the step 172, a red color value Cr1 within a bottom side of the boundary region 134 (e.g., Cr ∈ [obBND ... ibBND] may be scaled to make the mapping continuous per equation 7 as follows:

$$Cr2=(Cr1-obBND) \times (BND+(\text{map}Cr-ibBND) \times Cr\text{Scale})/BND+obBND \quad \text{Eq. 7}$$

In the step 174, a red color value Cr1 within a top side of the boundary region 134 (e.g., Cr ∈ [itBND ... otBND]) may also be scaled to make the mapping continuous per equation 8 as follows:

$$Cr2=(Cr1-otBND) \times (BND+(itBND-\text{map}Cr) \times Cr\text{Scale})/BND+otBND \quad \text{Eq. 8}$$

Within the transition region 138, a gradual blending of the mapping transition may be performed in a continuous way per equations 9 and 10 as follows:

$$Cr\text{Adjust}=\min(TBND,\min(orBND-Cb3,Cb3-olBND)) \quad \text{Eq. 9}$$

$$Cr3=(Cr2*Cr\text{Adjust}+Cr1*(TBND-Cr\text{Adjust}))/TBND \quad \text{Eq. 10}$$

To be completely continuous, equation 9 generally use Cb3 instead of Cb1. The corrected red color value may then be ready for recombination with the luminance component and the blue component by the combine circuit 146 (e.g., the step 156).

In some embodiments, the correction method 150 may complete the processing of the blue value Cb3 before completing the processing of the red value Cr3. The step groups A1 and B1 may be performed in substantially simultaneously in parallel. However, the step group B2 depends on the value of Cb3, thus the step group A2 should be completed before the step group B2 starts.

In other embodiments, the correction method 150 may be implemented to complete the processing of the red value Cr3 before the blue value Cb3. As before, the step groups A1 and B1 may be performed substantially simultaneously. However, equation pairs (i) 4 and 5 and (ii) 9 and 10 may be modified such that (i) the step group A2 depends on Cb2 and Cr3 (ii) the step group B2 depends on Cr2 and Cb1. As such, the step group B2 may be completed before the step group A2 starts.

Figure 4:
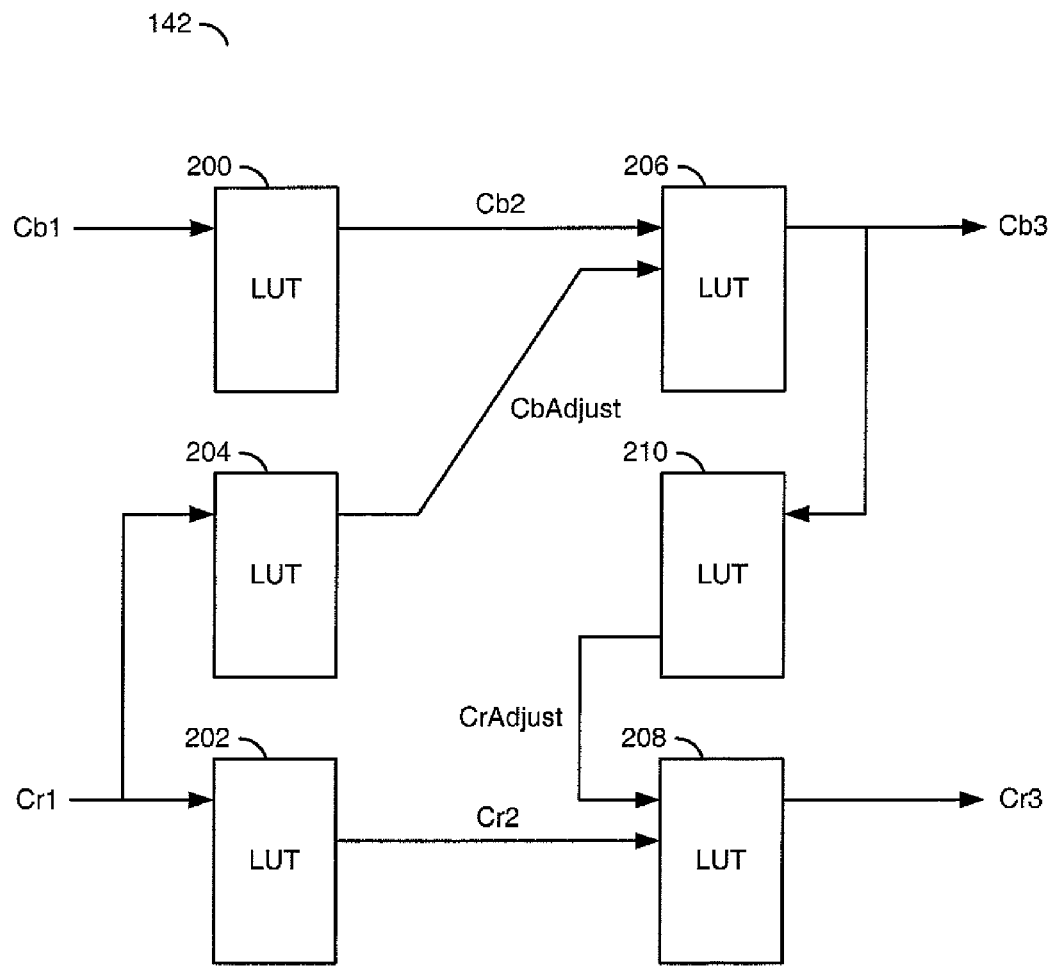
FIG. 4 is a detailed block diagram of an example implementation of a mapper circuit.

Referring to FIG. 4, a detailed block diagram of an example implementation of a mapper circuit 142 (e.g., circuit 142a) is shown. The mapper circuit 142 generally comprises a circuit (or module) 200, a circuit (or module) 202, a circuit (or module) 204, a circuit (or module) 206, a circuit (or module) 208 and a circuit (or module) 210. The circuit 200 may receive a blue color component signal Cb1 (e.g., signal Cb1a). The circuits 202 and 204 may receive a red color component signal Cr1 (e.g., signal Cr1a). The circuit 206 may present the corrected blue color component signal Cb3. The circuit 208 may present the corrected red color component signal Cr3. The circuit 204 may present the blue adjustment value CbAdjust to the circuit 206. The circuit 210 may present the red adjustment value CrAdjust to the circuit 208.

Each of the circuits 200-210 may be individually referred to as a lookup circuit. Each lookup circuit 200-210 may be operational as a lookup table (LUT). The lookup tables may be used to scale and adjust the various values from above. The scaling and adjustments may be linear and/or nonlinear, depending on the entries in the lookup tables. However, the above correction method 150 structure should still be observed. A design may process either Cr1 or Cb1 first. Without loss of generality, the following assumes Cb1 is processed first.

For samples (Cb,Cr) within a detection region 120, a continuous function in the lookup circuits 200, 204 and 206 generally maps Cb1 values within a specified range into Cb3 values in the same full range. The mapping is designed such that (i) a range compression about a desired "ideal" point and (ii) a range expansion away from the ideal point (to maintain the continuous mapping) may be achieved. The mapping may include a blending (e.g., in the transition region 138) at the boundary of Cr values not within the region. The blending may be adopted such that a continuous transition between Cb values that undergo the above mapping and Cb values (closer to the Cr boundary) that do not is created.

Similarly, an analogous process may be performed for Cr values using the lookup circuits 202, 210 and 208. However, the final blending stage should use the already processed Cb3 values in order to maintain completely continuous mappings. For example, group A2 follows group A1, group B1 may be performed in parallel with group A1 (and possibly A2), group B2 follows group B1 and group B2 follows group A2.

Figure 5:
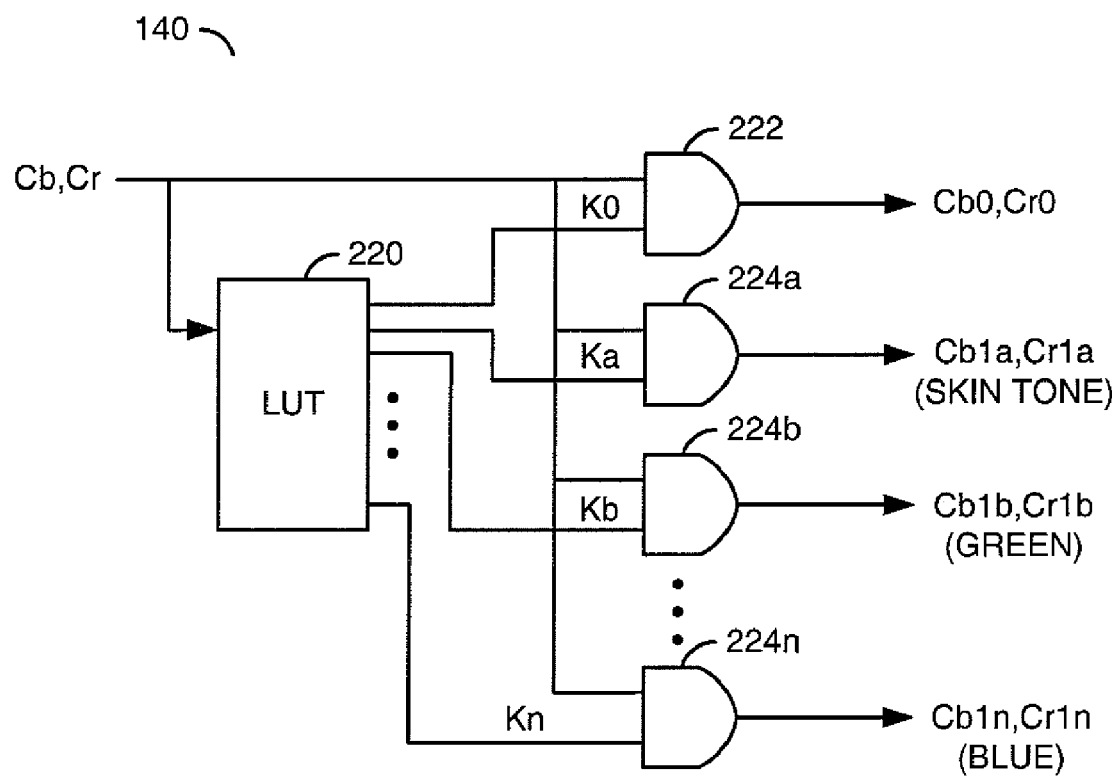
FIG. 5 is a detailed diagram of an example implementation of a separator circuit.

Referring to FIG. 5, a detailed diagram of an example implementation of the separator circuit 140 is shown. The separator circuit 140 generally comprises a circuit (or module) 220, a circuit (or module) 222 and one or more circuits (or modules) 224a-224n. All of the circuits 220-224n may receive the signals Cb and Cr. The circuit 220 may present a control signal (e.g., K0) to the circuit 222. The circuit 220 may also present one or more control signals (e.g., Ka-Kn) to the circuits 224a-224n respectively. The circuits 224a-224n may generate the signal pairs Cb1a-Cb1n and Cr1a-Cr1n respectively.

The circuit 220 may be referred to as a selection lookup circuit. Each of the circuits 222 and 224a-224n may be referred to as a pass gate (e.g., logical AND gates). The selection lookup circuit 220 may be operational to determine if a color pair (Cb,Cr) falls inside any of the one or more detection regions 120 or not. If not, the control signal K0 may be asserted causing the pass gate 222 to pass the signals Cb and Cr through as the signals Cb0 and Cb0. If the color pair (Cb,Cr) falls inside one or more detection regions 120, the appropriate control signal Ka-Kn may be asserted such that the respective pass gates 224a-224n forward the color values to the appropriate mapping circuit 142a-142n.

Figure 6:
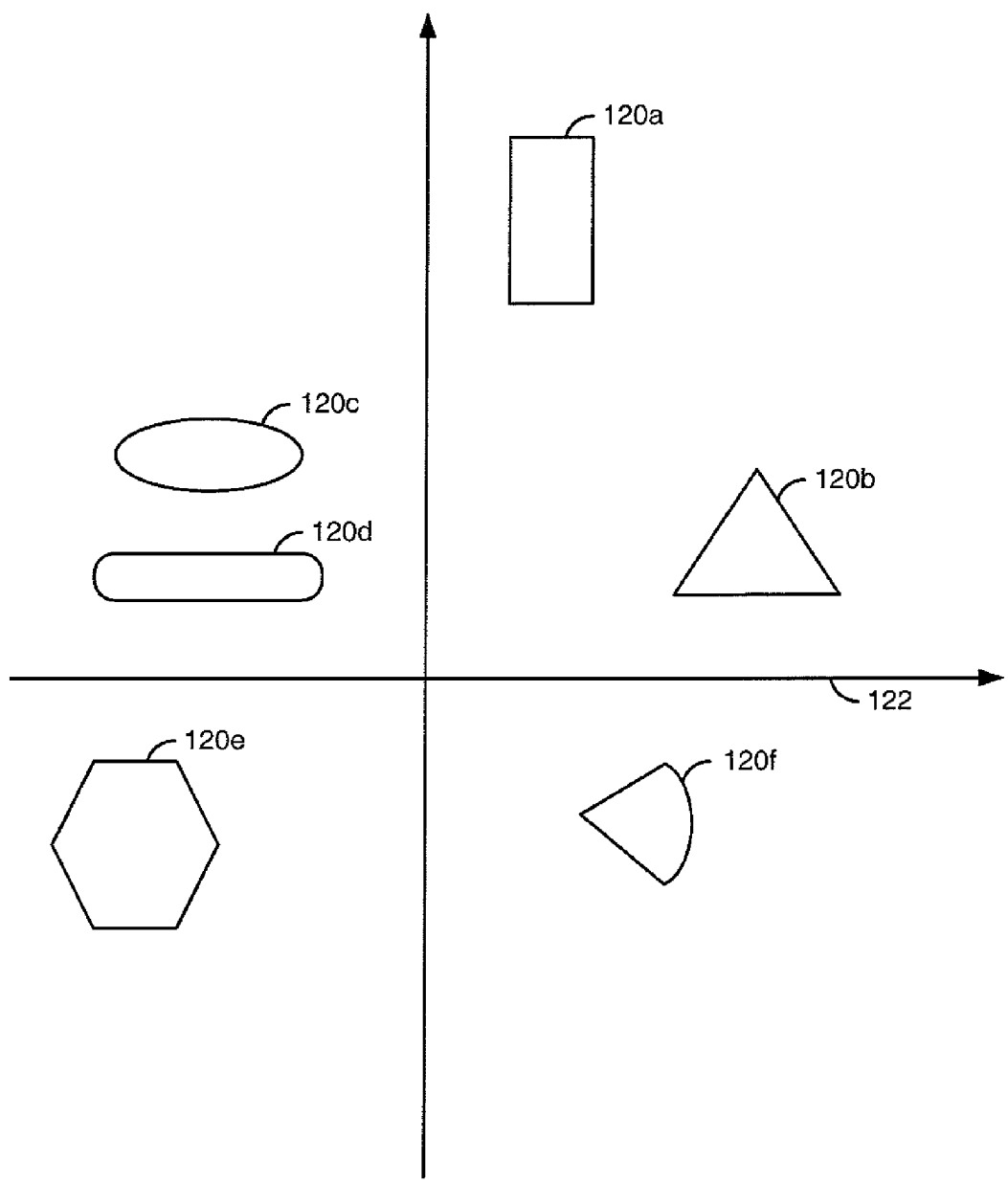
FIG. 6 is a diagram of an example set of detection regions.

Referring to FIG. 6 a diagram of an example set of detection regions is shown. The present invention may be applied to regions of colorspace other than just skin tones. In particular, multiple (e.g., 3) parallel mapping circuits 142a-142n may be implemented in a single system 100. The separator circuit 102 may be configured to recognize and separately correct multiple (e.g., 3) different zones of hues 120a-120f. For example, the system 100 may simultaneously account for a skin tone (e.g., "seashell pink"), a green tone (e.g., "grass green" and/or "green foliage") and a blue tone (e.g., "sky blue" and/or "water blue"). Generally, reds, yellows, purples and other colors may not have natural references against which many viewers may strongly judge. Therefore, many natural images may appear unnatural if the color saturation is not appropriately adjusted for the skin regions, green regions and/or blue regions. Furthermore, each of the regions may have the same or different shapes (e.g., rectangle, pie, triangle, oval, ellipse, hexagon).

The functions performed by the diagrams of FIGS. 1, 3, 4 and 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A display device comprising:
a circuit configured to (i) generate a plurality of intermediate components by scaling a plurality of first color components of video towards an ideal color, wherein said first color components fall inside a region of a color space, (ii) generate a plurality of corrected components by adjusting said intermediate components such that a mapping of said first color components to said corrected components is continuous in said color space and (iii) generate an image that is color tone corrected by combining said corrected components with a plurality of second color components of said video that fall outside said region.

2. The display device according to claim 1, wherein said display device comprises at least one of (i) a television, (ii) a digital television, (iii) a display and (iv) a digital display.

3. The display device according to claim 1, wherein said circuit is further configured to separate said first color components from said second color components prior to generating said intermediate components.

4. The display device according to claim 1, wherein said first color components comprise a plurality of blue components and a plurality of red components of said video.

5. The display device according to claim 1, wherein said circuit is further configured to calculate at least one of (i) a shape of said region and (ii) a location of said region in said color space in response to a user adjustment.

6. The display device according to claim 1, wherein said video is received in a signal formatted as at least one of (i) an EIA-770 signal, (ii) a High Definition Multimedia Interface signal, (iii) a Digital Video Interface signal, (iv) a BT.601 signal and (v) a BT.656 signal.

7. The display device according to claim 1, wherein said circuit is further configured to (i) generate a plurality of blue corrected components of said corrected components and (ii) generate a plurality of red corrected components of said corrected components in response to said blue corrected components.

8. The display device according to claim 1, wherein said region comprises at least one of (i) a skin tone region, (ii) a grass region, (iii) a water region and (iv) a sky region.

9. The display device according to claim 1, wherein said region has a shape comprising at least one of (i) a rectangular shape, (ii) a triangular shape, (iii) an oval shape, (iv) a pie shape, (v) a hexagonal shape and (vi) an elliptical shape.

10. The display device according to claim 1, wherein said circuit is further configured to maintain a plurality of luminance components of said video unchanged during said color tone correction.

11. A method for color tone correction in a display device, comprising the steps of:
(A) generating a plurality of intermediate components by scaling a plurality of first color components of video towards an ideal color, wherein said first color components fall inside a region of a color space;
(B) generating a plurality of corrected components by adjusting said intermediate components such that a mapping of said first color components to said corrected components is continuous in said color space; and
(C) generating an image that is said color tone corrected by combining said corrected components with a plurality of second color components of said video that fall outside said region.

12. The method according to claim 11, wherein said display device comprises at least one of (i) a television, (ii) a digital television, (iii) a display and (iv) a digital display.

13. The method according to claim 11, further comprising the step of:
separating said first color components from said second color components prior to generating said intermediate components.

14. The method according to claim 11, wherein said first color components comprise a plurality of blue components and a plurality of red components of said video.

15. The method according to claim 11, wherein further comprising the step of:
calculating at least one of (i) a shape of said region and (ii) a location of said region in said color space in response to a user adjustment.

16. The method according to claim 11, wherein said video is received in a signal formatted as at least one of (i) an EIA-770 signal, (ii) a High Definition Multimedia Interface signal, (iii) a Digital Video Interface signal, (iv) a BT.601 signal and (v) a BT.656 signal.

17. The method according to claim 11, wherein step (B) comprises the sub-steps of:
generating a plurality of blue corrected components of said corrected components; and
generating a plurality of red corrected components of said corrected components in response to said blue corrected components.

18. The method according to claim 11, wherein said region comprises at least one of (i) a skin tone region, (ii) a grass region, (iii) a water region and (iv) a sky region.

19. The method according to claim 11, wherein said region has a shape comprising at least one of (i) a rectangular shape, (ii) a triangular shape, (iii) an oval shape, (iv) a pie shape, (v) a hexagonal shape and (vi) an elliptical shape.

20. A display device comprising:
means for generating a plurality of intermediate components by scaling a plurality of first color components of video towards an ideal color, wherein said first color components fall inside a region of a color space;
means for generating a plurality of corrected components by adjusting said intermediate components such that a mapping of said first color components to said corrected components is continuous in said color space; and
means for generating an image that is color tone corrected by combining said corrected components with a plurality of second color components of said video that fall outside said region.

* * * * *